United States Patent
Altares et al.

(10) Patent No.: US 10,339,310 B1
(45) Date of Patent: Jul. 2, 2019

(54) DETECTION OF MALICIOUS ATTACHMENTS ON MESSAGES

(71) Applicant: Symantec Corporation, Mountain View, CA (US)

(72) Inventors: Eduardo Altares, Antipolo (PH); Maersk Chastine Menrige, Quezon (PH)

(73) Assignee: Symantec Corporation, Mountain View, CA (US)

( * ) Notice: Subject to any disclaimer, the term of this patent is extended or adjusted under 35 U.S.C. 154(b) by 107 days.

(21) Appl. No.: 15/647,895

(22) Filed: Jul. 12, 2017

(51) Int. Cl.
*G06F 21/56* (2013.01)
*H04L 29/06* (2006.01)
*H04L 12/58* (2006.01)

(52) U.S. Cl.
CPC ............ *G06F 21/56* (2013.01); *G06F 21/563* (2013.01); *G06F 21/566* (2013.01); *H04L 63/123* (2013.01); *G06F 21/562* (2013.01); *H04L 51/12* (2013.01); *H04L 63/1441* (2013.01)

(58) Field of Classification Search
CPC ...... G06F 21/56; G06F 21/563; G06F 21/566; G06F 21/562; H04L 63/123; H04L 51/12; H04L 63/1441
See application file for complete search history.

(56) References Cited

U.S. PATENT DOCUMENTS

| | | | |
|---|---|---|---|
| 9,246,933 B1 * | 1/2016 | Krishnappa | H04L 63/1433 |
| 9,686,308 B1 * | 6/2017 | Srivastava | H04L 51/12 |
| 9,888,019 B1 * | 2/2018 | Pidathala | H04L 63/145 |
| 10,050,998 B1 * | 8/2018 | Singh | H04L 63/1416 |
| 2005/0289148 A1 * | 12/2005 | Dorner | G06F 21/52 |
| 2006/0212712 A1 * | 9/2006 | Braverman | G06F 21/562 713/181 |
| 2007/0006312 A1 * | 1/2007 | Li | H04L 3/1441 726/24 |
| 2016/0127400 A1 * | 5/2016 | Rihn | G06F 21/56 726/24 |
| 2017/0223046 A1 * | 8/2017 | Singh | H04L 43/062 |
| 2017/0244736 A1 * | 8/2017 | Benishti | H04L 63/1441 |
| 2018/0152471 A1 * | 5/2018 | Jakobsson | G06Q 50/01 |

* cited by examiner

Primary Examiner — Matthew Smithers
(74) Attorney, Agent, or Firm — Holland & Hart LLP

(57) ABSTRACT

A method for determining malicious attachments on messages is described. A computing device may receive an electronic message, including one or more unopened attachments, and identify one or more characteristic values of the message header, message body, or attachments of the message. The computing device may analyze the identified characteristics and in some instances compare at least a portion of the characteristics, individually or in combination, with one or more configured thresholds of the computing device. The computing device may determine an attachment is embedded with a macro. The macro may be associated with a visual basic application (VBA) and contain malicious code. Based on the determination, the computing device may initiate a security protocol, including notification via a user interface of the device.

18 Claims, 11 Drawing Sheets

DETECTION OF MALICIOUS ATTACHMENTS ON MESSAGES

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence of malicious programs such as rootkits, spyware, Trojan, and the like. Malware programmers are continually adapting to the improvements made in malware detection. Due to the adapted methods and implementations imposed by malware programmers, security detection methods at the endpoint may not be sufficient for a device to efficiently detect malware.

SUMMARY

According to at least one embodiment, a method for detecting malicious attachments within electronic messages is described. In one embodiment, the method may include: receiving an electronic message including an unopened attachment, analyzing a characteristic associated with the electronic message or a characteristic associated with the unopened attachment, determining the unopened attachment is malicious based at least in part on the analyzing, and performing a security action based at least in part on the determining. In some cases, the method may be performed by one or more computing devices, including at least one processor.

A computing device configured for detecting malicious attachments within electronic messages is also described. The computing device may include one or more processors and memory in electronic communication with the one or more processors. The memory may store computer executable instructions that when executed by the one or more processors cause the one or more processors to receive an electronic message including an unopened attachment, analyzing a characteristic associated with the electronic message or a characteristic associated with the unopened attachment, determine the unopened attachment is malicious based at least in part on the analyzing, and perform a security action based at least in part on the determining.

A non-transitory computer-readable storage medium storing computer executable instructions is also described. When the instructions are executed by one or more processors, the execution of the instructions may cause the one or more processors to receive an electronic message including an unopened attachment, analyzing a characteristic associated with the electronic message or a characteristic associated with the unopened attachment, determine the unopened attachment is malicious based at least in part on the analyzing, and perform a security action based at least in part on the determining.

Some examples of the method, computing device, and non-transitory computer-readable storage medium described above for analyzing the characteristic associated with the electronic message, the characteristic associated with the unopened attachment, or both may further include processes, features, means, or instructions for identifying a send time associated with the electronic message based at least in part on a header of the electronic message, and identifying a creation time, an edit time, a length of the unopened attachment, or a combination thereof associated with the unopened attachment.

Some examples of the method, computing device, and non-transitory computer-readable storage medium described above for determining that the unopened attachment is malicious may further include processes, features, means, or instructions for comparing the send time associated with the electronic message to the creation time associated with the unopened attachment, and determining that the creation time satisfies a threshold difference between the send time and the creation time.

Some examples of the method, computing device, and non-transitory computer-readable storage medium described above may further include processes, features, means, or instructions for determining that the edit time satisfies a threshold based at least in part on determining that the creation time does not satisfy the threshold difference. In some examples of the method, apparatus, and non-transitory computer-readable medium described above, the determining that the edit is below the threshold indicates that the unopened attachment is created via automation. In some examples of the method, apparatus, and non-transitory computer-readable medium described above, the threshold comprises a threshold value or a threshold range.

Some examples of the method, computing device, and non-transitory computer-readable storage medium described above for determining that the unopened attachment is malicious may further include processes, features, means, or instructions for determining that the length of the unopened attachment is above a threshold length, wherein the length includes a number of pages. Some examples of the method, computing device, and non-transitory computer-readable storage medium described above for determining that the unopened attachment is malicious may further include processes, features, means, or instructions for determining that the unopened attachment includes an embedded macro.

Some examples of the method, computing device, and non-transitory computer-readable storage medium described above for determining that the unopened attachment is malicious may further include processes, features, means, or instructions for determining that the length of the unopened attachment is above a threshold length, wherein the length includes a number of pages. Some examples of the method, computing device, and non-transitory computer-readable storage medium described above for determining that the unopened attachment is malicious may further include processes, features, means, or instructions for determining that the unopened attachment includes an embedded macro.

Some examples of the method, computing device, and non-transitory computer-readable storage medium described above for performing the security action may further include processes, features, means, or instructions for flagging the electronic message, and providing for display the flagged electronic message to a user via a user interface of the client device. Some examples of the method, computing device, and non-transitory computer-readable storage medium described above for performing the security action may further include processes, features, means, or instructions for quarantining the electronic message based at least in part on a security policy.

In some examples of the method, apparatus, and non-transitory computer-readable medium described above, the electronic message comprises an e-mail. In some examples of the method, apparatus, and non-transitory computer-readable medium described above, the characteristic associated with the electronic message comprises a subject field, a send time field, a send date field, a recipient field, or a combination thereof. In some examples of the method, apparatus, and non-transitory computer-readable medium described above, the unopened attachment comprises a macro-embedded document. In some examples of the method, apparatus, and non-transitory computer-readable medium described above, the characteristic associated with the unopened attachment comprises a creation time, a save time, an edit time, a number of pages, or a file format, a macro, or a combination thereof.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
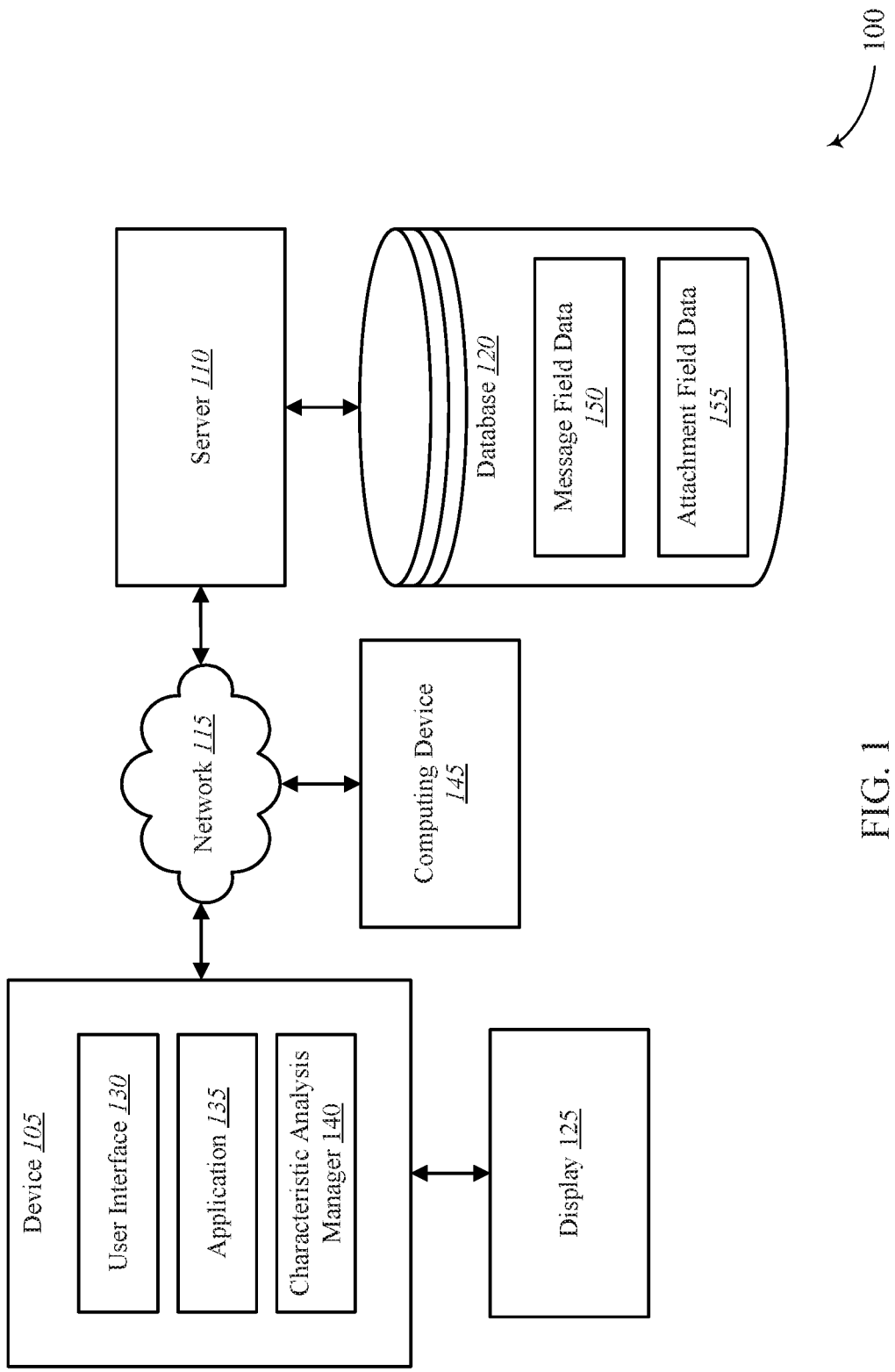
FIG. 1 illustrates an example block diagram of an environment that supports detection of malicious attachments on messages, in accordance with one or more aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE INVENTION

Malware programmers have implemented a variety of techniques for security infiltration, including engineered messages containing disguised attachments (i.e., macro downloaders) which are malware embedded. The attachments, when opened, may execute command instructions to download and run the contained malware payload, or execute an additional code script to download an alternative malware payload. A computing device may have difficulty detecting malware included in a macro embedded attachment via endpoint-based security methods, as de-compilation and emulation restrictions at the device may impede detection of malicious signatures. Malware programmers have also implemented additional counter methods and obstructions to security detection, including at least encryption, polymorphism, string concatenation, adding junk codes, and code splitting amongst several modules and/or forms.

The described features generally relate to methods, systems, and computing devices for detecting malicious attachments on electronic messages. A computing device may receive an electronic message that includes an attachment. The attachment may be a macro embedded document (e.g., a visual basic application (VBA)) that includes instructions to download or execute a malware payload, or both. In some examples, the malware payload may incorporate one or more complications including at least encryption, polymorphism, string concatenation, junk codes, splitting codes into multiple modules or forms. The detection techniques described herein may utilize malware detection methods which precede endpoint-based malicious signature detection. That is, the techniques described herein may relate to analyzing one or more characteristics associated with a received electronic message or an unopened attachment of the message, or both. In some cases, the analysis may include comparing the one or more characteristics with a determined threshold value or threshold range configured at the computing device. Determining that a threshold is satisfied may result in performing a security action independent of an application de-compilation, reducing latency and overhead with regard to antimalware methods at the device.

In some embodiments, a computing device may receive an email, as well as one or more unopened attachments associated with the email. An unopened attachment may be macro embedded. The macro may be associated with a VBA and include malicious code. Based on the receiving, the computing device may initiate malware detection and preemptively analyze the email, metadata contained within the header of the email, and attachments of the email prior to opening an attachment of the email.

The computing device may evaluate the header of the email, and execute configured instructions to identify and examine one or more characteristics or values included in the header information. In some cases, a computing device may evaluate a header of an electronic message and parse identified data and field values in accordance with configuration instructions. For example, a computing device may parse a header and identify at least one of a send time, a send date, or a recipient field or a combination thereof of an electronic message. The computing device may also evaluate at least a content type listed in a header and a body of an electronic message, and determine if the electronic message contains an attachment and the length of the attachment. Additionally, the computing device may identify at least one of a creation time, an edit time, or a length of the unopened attachment.

Once the computing device identifies the detected characteristic values of the electronic message, the computing device may compare at least a portion of the detected characteristic values with one or more configured threshold values or threshold ranges. In some embodiments, the computing device may compare a singular characteristic with a configured threshold of the device, or a plurality of characteristics, alone or in combination. For a plurality of characteristics, the computing device may analyze the characteristics synchronously or sequentially. For example, a computing device may identify an attachment of an electronic message, analyze at least the body of the electronic message and the attachment, and determine that the attachment is macro embedded. Based on the determination of a macro downloader within the attachment of the electronic message, the computing device may determine that the unopened attachment includes malware. In addition or alternative to the aforementioned determination, the computing device may compare the length of the unopened attachment to a threshold value (e.g., a number of pages). If the length exceeds a configured threshold value of the device, the computing device may determine that the macro embedded attachment of the electronic message includes malware.

In some embodiments, the computing device may compare a send time associated with an electronic message to a creation time associated with an unopened attachment of the electronic message. If the time duration between the creation time of the attachment and the send time of the electronic message satisfies a threshold difference (i.e., below the threshold value), the computing device may determine that the unopened attachment of the electronic message includes malware. Alternatively, the computing device may determine that the creation time does not satisfy a threshold difference, evaluate the identified edit time of the electronic message, and compare the identified edit time to a configured threshold value. If the edit time satisfies the configured threshold value (i.e., below the threshold value) the computing device may detect that the unopened attachment was autonomously generated and determine that the unopened attachment of the electronic message includes malware.

Following the determination that malware is present within the electronic message, the computing device may enact a security protocol and perform operations for preventing penetration of the malicious information. For example, the computing device may classify the electronic message as malicious, and notify a user via a user interface of the computing device. In some cases, the computing device may enact one or more additional configured security procedures and isolate the malicious message within a designated portion of memory of the computing device.

FIG. 1 illustrates an example block diagram of an environment 100 that supports detection of malicious attachments on messages, in accordance with one or more aspects of the present disclosure. In some embodiments, the techniques described herein may be performed on a device (e.g., device 105). As depicted, the environment 100 may include a device 105, server 110, a display 125, a computing device 145, and a network 115 that allows the device 105, the server 110, and the computing device 145 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115. Examples of computing device 145 may include any combination of a mobile computing device, a laptop, a desktop, a server, a media set top box, or any combination thereof. Examples of server 110 may include any combination of a data server, a cloud server, a server associated with an automation service provider, proxy server, mail server, web server, application server, database server, communications server, file server, home server, mobile server, name server, or any combination thereof.

In some embodiments, the device 105 may include a user interface 130, application 135, and characteristic analysis manager 140. Although the components of the device 105 are depicted as being internal to the device 105, it is understood that one or more of the components may be external to the device 105 and connect to device 105 through wired or wireless connections, or both. In some embodiments, application 135 may be installed on computing device 145 in order to allow a user to interface with a function of device 105, characteristic analysis manager 140, or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G, LTE, or new radio (NR) systems (e.g., 5G) for example), etc. In some configurations, the network 115 may include the Internet. It is noted that in some embodiments, the device 105 may not include a characteristic analysis manager 140. For example, device 105 may include application 135 that allows device 105 to interface with a user via characteristic analysis manager 140 located on another device such as a computing device 145 or server 110, or both. In some embodiments, device 105, and server 110 may include a characteristic analysis manager 140 where at least a portion of the functions of characteristic analysis manager 140 are performed separately or concurrently on device 105 or server 110, or both. Similarly, in some embodiments, a user may access the functions of device 105 (directly or through device 105 via characteristic analysis manager 140) from computing device 145. For example, in some embodiments, computing device 145 includes a mobile application that interfaces with one or more functions of device 105, characteristic analysis manager 140, or server 110.

In some embodiments, server 110 may be coupled to database 120. Database 120 may be internal or external to the server 110. In one example, device 105 may be coupled directly to database 120, database 120 being internal or external to device 105. Database 120 may include at least message field data 150 and attachment field data 155. For example, device 105 may access message field data 150 in database 120 over network 115 via server 110. Message field data 150 may include data regarding one or more identified characteristics of an electronic message and a header contained within the electronic message. Message field data 150 may include at least a subject field, a send time field, a send date field, and a recipient field of one or more electronic messages received at a device 105. Attachment field data 155 may include data associated to the one or more identified characteristics of an unopened message attachment. Attachment field data 155 may include at least a creation time, a save time, an edit time, a number of pages, a file format, and a macro of one or more electronic messages received at a device 105. In some embodiments, characteristic analysis manager 140 may be configured to perform the techniques described herein in conjunction with user interface 130 and application 135. Further details regarding the characteristic analysis manager 140 are discussed below.

Figure 2:
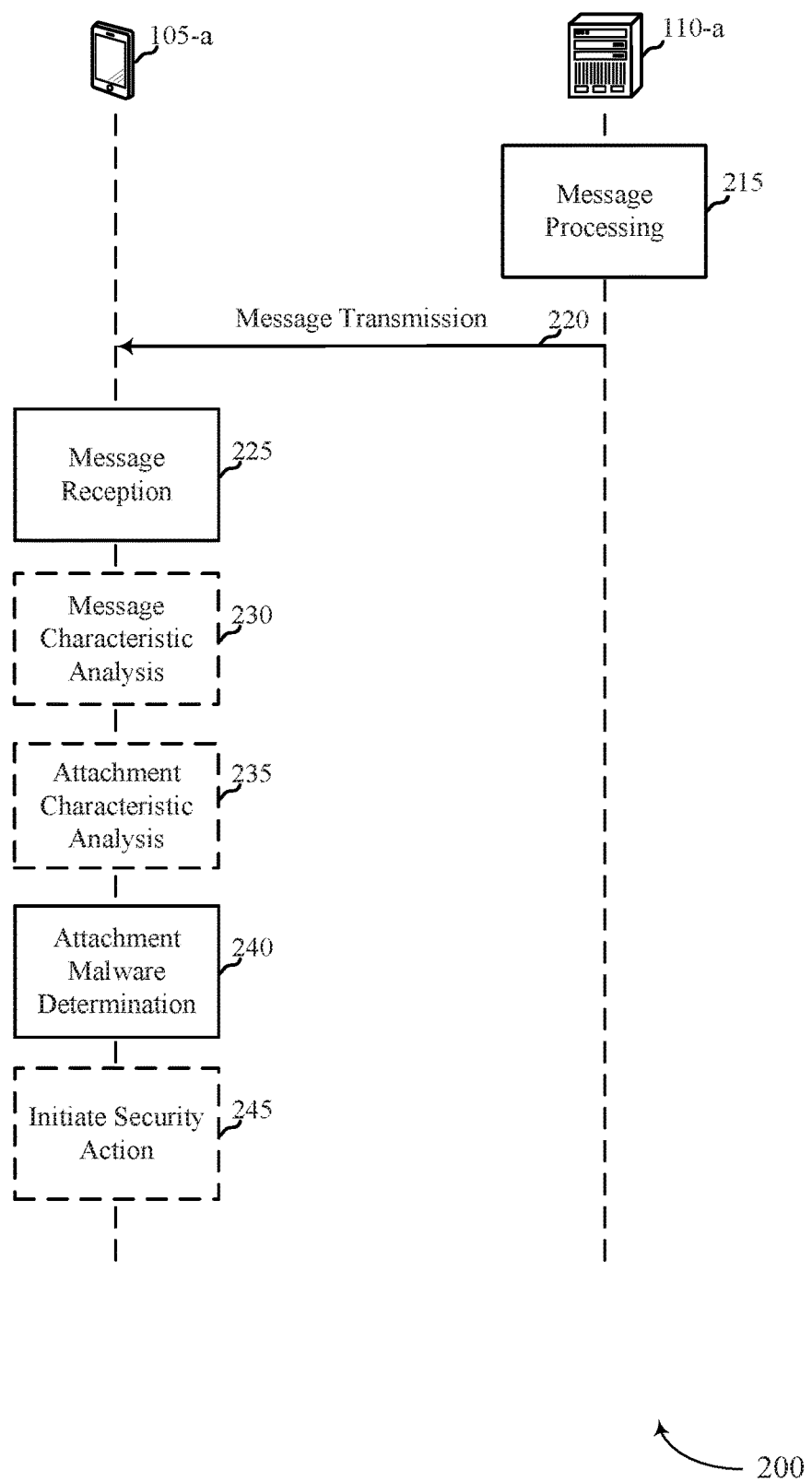
FIG. 2 illustrates an example of a process flow that supports detection of malicious attachments on messages, in accordance with one or more aspects of the present disclosure.

FIG. 2 illustrates an example of a process flow 200 that supports detection of malicious attachments on messages, in accordance with one or more aspects of the present disclosure. In some configurations, process flow 200 may be implemented by the characteristic analysis manager 140 as described in FIG. 1. In some configurations, process flow 200 may be implemented in conjunction with the application 135 and/or the user interface 130 described with reference to FIG. 1. Device 105-*a* and server 110-*a* may be an example of aspects of device 105 and server 110 as described with reference to FIG. 1.

In the following description of the process flow 200, the operations between device 105-*a* and server 110-*a* may be transmitted in a different order than the exemplary order shown, or the operations performed by device 105-*a* or server 110-*a* may be performed in different orders or at different times. Certain operations may also be left out of the process flow 200, or other operations may be added to the process flow 200.

At block 215, server 110-*a* may perform message processing. Message processing may include queuing and/or processing a generated electronic message in accordance with a mail transfer protocol. Server 110-*a* may receive an electronic message and associated attachments and process contained header information of the electronic message. In some cases, the electronic message may be an email. Based on the contained header information, server 110-*a* may consult additional servers (e.g., Domain Name System (DNS) server), generate additional metadata to be included in the header information of the electronic message. The additional metadata may include at least routing information, authentication, and qualifiers as to the validity of the email (i.e., Sender Policy Framework). Server 110-*a* may route the electronic message for delivery to an addressed recipient based on the validity of the electronic message.

Server 110-*a* may deliver the electronic message and included attachments to device 105-*a* via message transmission 220. In some cases, server 110-*a* may deliver the electronic message to a mail exchange recipient (i.e., MTA) of an addressed target domain, where the mail exchange recipient may route the electronic message to the device 105-*a*. At block 225, the device 105-*a* may perform message reception. For example, device 105-*a* may receive the electronic message from server 110-*a*, along with the attachments and metadata of the electronic message via a message application running on the device 105-*a*. The message application may be encoded to provide notification information, and flag the received message as received via a user interface of the device 105-*a*

At block 230, device 105-*a* may perform message characteristic analysis. This may include evaluating and identifying one or more field and data values (i.e., characteristic values) associated with the electronic message and the metadata within the electronic message header and message body. Device 105-*a* may process and parse the header of the received electronic message, and identify at least one of a send time, a send date, a recipient field, and a subject field, or a combination thereof. Additionally, device 105-*a* may evaluate the electronic message and determine the message includes one or more attachments. Device 105-*a* may store the identified characteristic values within memory for subsequent analysis.

At block 235, device 105-*a* may perform attachment characteristic analysis. In some cases, upon determining that the message includes one or more unopened attachments, device 105-*a* may analyze and identify characteristic values of the attachments. This may include identifying at least one of a creation time, an edit time, and a length of the one or more attachments, or any combination thereof. Device 105-*a* may store the identified values within memory for subsequent analysis. In some cases, at least the listed characteristics may be included in a portion (e.g., FILETIME from SummaryInformation) of an Object Linking and Embedding (OLE) file. In other cases, at least the listed characteristics may be included in a portion (e.g., DocumentProperties) of an interface associated with an Office Open xml and/or a multipurpose internet mail extensions hypertext markup language (MIME HTML) format.

At block 240, device 105-*a* may perform attachment malware determination. For example, device 105-*a* may determine whether malware is present within the one or more unopened attachments of the electronic message via evaluation of identified characteristics of at least one of the message, the message header, and the enclosed attachments, or a combination thereof. In some cases, device 105-*a* may be configured with one or more threshold values or threshold ranges for determining whether the one or more unopened attachments of the electronic message are malicious. Device 105-*a* may compare an identified send time of the electronic message to a creation time associated with the unopened attachment of the message. If the time difference between the creation time of the attachment and the send time of the message satisfies the threshold difference configured at device 105-*a*, device 105-*a* may determine that the unopened attachment contains malware. For example, if the identified creation time of the attachment is less than twenty four hours prior to the send time of the message, device 105-*a* may determine that the unopened attachment includes malware. Alternatively, in some cases, device 105-*a* may determine that the time difference between the creation time of the attachment and the send time of the message exceeds the configured threshold difference, and evaluate an edit time (i.e., duration) of the attachment. If the edit time satisfies a configured threshold of device 105-*a*, device 105-*a* may determine that the edit time is indicative of the attachment being autonomously generated, and hence includes malware. For example, device 105-*a* may identify that the edit time of the attachment contains a value of zero and determine that the attachment is autonomously generated.

In some cases, device 105-*a* may determine that an attachment is macro embedded (i.e., includes a VBA) and identify the attachment as malicious based at least in part on the attachment being macro embedded. Additionally, device 105-*a* may identify the length of the attachment. When device 105-*a* determines the length exceeds a configured threshold, device 105-*a* may determine that the attachment contains or is likely to contain malware. As one example, device 105-*a* may identify that a length of the attachment is 4 pages which exceeds a threshold value (e.g., 3 pages). Device 105-*a*, in some cases, may identify a length of the attachment based on metadata of the electronic message or of the attachment itself. Device 105-*a* may perform mentioned methods of analysis individually or in combination. In some cases, device 105-*a* may provide a risk factor that indicates a probability that the attachment is malicious. As one example, device 105-*a* may determine that there is a 75% chance the attachment is malicious based at least in part on the risk factor.

At block 245, device 105-*a* may initiate a security action. In some cases, device 105-*a* may perform or initiate a security action based on the preceding analysis and determination of malware presence within an attachment of the received electronic message. Device 105-*a* may classify (i.e., flag) the electronic message as malicious and display via an interface of the device, a notification of the security action. In some cases, the security protocol of device 105-*a* may include quarantining the detected message within a designated portion of memory.

In some cases, implementation of the one or more methods described above may be based on the results determined in preceding methods of the process flow 200. For example, device 105-*a* performing message characteristic analysis at block 230 may be dependent on message reception at block 225. Further, the implementation of attachment characteristic analysis at block 235 may depend at least on determining that the message includes a macro embedded attachment based on message characteristic analysis at block 230. In some cases, initiating a security action at block 245 may be dependent upon at least one of analysis methods at block 230, analysis methods at block 235, as well as the results of attachment malware determination at block 240, or any combination thereof.

Figure 3:
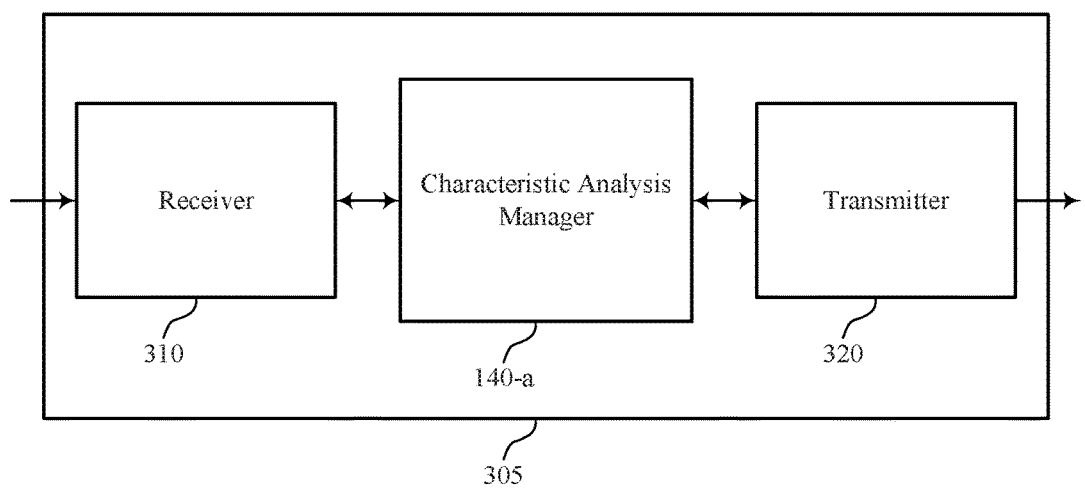
FIGS. 3 through 5 illustrate block diagrams of a device that supports detection of malicious attachments on messages, in accordance with one or more aspects of the present disclosure.

FIG. 3 illustrates a block diagram of a device 305 that supports detection of malicious attachments on messages, in accordance with one or more aspects of the present disclosure. Device 305 may be an example of aspects of a device 105 or computing device 145 as described with reference to FIG. 1. Device 305 may include a receiver 310, characteristic analysis manager 140-*a*, and a transmitter 320. Device 305 may also include one or more processors. Each of the components of device 305 may be in communication with one another (e.g., via one or more buses).

Receiver 310 may receive electronic messages (i.e., emails) along with included metadata and unopened attachments over via an exchange server associated with a target domain of the device 305. Receiver 310 may communicate with one or more servers 110 over a network 115 as described with reference to FIG. 1. A received message and components of the message may be passed on to other components of the device 305. In some cases, receiver 310 may be an example of aspects of the transceiver 625 described with reference to FIG. 6. The receiver may utilize a single antenna or a set of antennas.

Characteristic analysis manager 140-*a* may be an example of aspects of the characteristic analysis manager 140 described with reference to FIG. 1. Characteristic analysis manager 140-*a* and/or at least some of the sub-components of manager 140-*a* implemented in hardware, software executed by one or more processors, firmware, or any combination thereof. If implemented in software executed by one or more processors, the functions of characteristic analysis manager 140-*a* and/or at least some of the various sub-components of manager 140-*a* may be executed by one or more general-purpose processors, digital signal processors (DSPs) application-specific integrated circuits (ASICs), field-programmable gate arrays (FPGAs), or other programmable logic devices, discrete gates or transistor logic, discrete hardware components, or any combination thereof designed to perform the functions described in the present disclosure.

Characteristic analysis manager 140-*a* and/or at least some of the various sub-components of manager 140-*a* may be physically located at various positions, including being distributed such that portions of functions are implemented at different physical locations by one or more physical devices. In some examples, characteristic analysis manager 140-*a* and/or at least some of the various sub-components of manager 140-*a* may be separate and distinct components in accordance with various aspects of the present disclosure. In other examples, characteristic analysis manager 140-*a* and/ or at least some of the various sub-components of man-ager 140-*a* may be combined with one or more other hardware components, including but not limited to an I/O component, a transceiver, a network server, another computing device, one or more other components described in the present disclosure, or a combination thereof in accordance with various aspects of the present disclosure.

Characteristic analysis manager 140-*a* may preemptively analyze a received electronic message, metadata contained within a header of the electronic message, and one or more attachments of the electronic message. Based on the analysis characteristic analysis manager 140-*a* may execute configured instructions to identify and examine one or more characteristic values of the electronic message and attachment. Characteristic analysis manager 140-*a* may analyze the information contained within the header and body of the electronic message and identify at least one of a send time, a send date, or a recipient field, or a combination thereof of the electronic message. Characteristic analysis manager 140-*a* may evaluate at least a content type listed in the header and the body of the message, and determine if the message includes an attachment. Additionally, characteristic analysis manager 140-*a* may analyze additional characteristics associated with the electronic message and identify at least one of a creation time, an edit time, or a length of the unopened attachment.

Characteristic analysis manager 140-*a* may compare at least a portion of the detected characteristic values of the electronic message and the attachments of the message with one or more threshold values or threshold ranges configured for the device 305. Additionally, characteristic analysis manager 140-*a* may determine whether an attachment of the message is macro embedded (i.e., contains a VBA). Upon satisfaction of one or more of the thresholds and determinations, characteristic analysis manager 140-*a* may determine that an attachment of the electronic message includes malware. Based on the determination that malware is included in the electronic message (i.e., that the unopened attachment of the electronic message includes malware), characteristic analysis manager 140-*a* may enact a security protocol and perform operations for preventing penetration of the malicious information, including classifying the electronic message as malicious and providing notification of the malicious information via an interface of the device 305. In some cases, characteristic analysis manager 140-*a* may enact one or more configured security protocols of the device 305 and isolate the malicious message within a designated portion of memory.

Transmitter 320 may at least transmit signals generated by other components of the device 305, provide notification to one or more components of the device 305, and route data information. In some examples, transmitter 320 may be collocated with a receiver 310 in a transceiver component. For example, transmitter 320 may be an example of aspects of the transceiver 625 described with reference to FIG. 6. Transmitter 320 may utilize a single antenna or a set of antennas.

Figure 4:
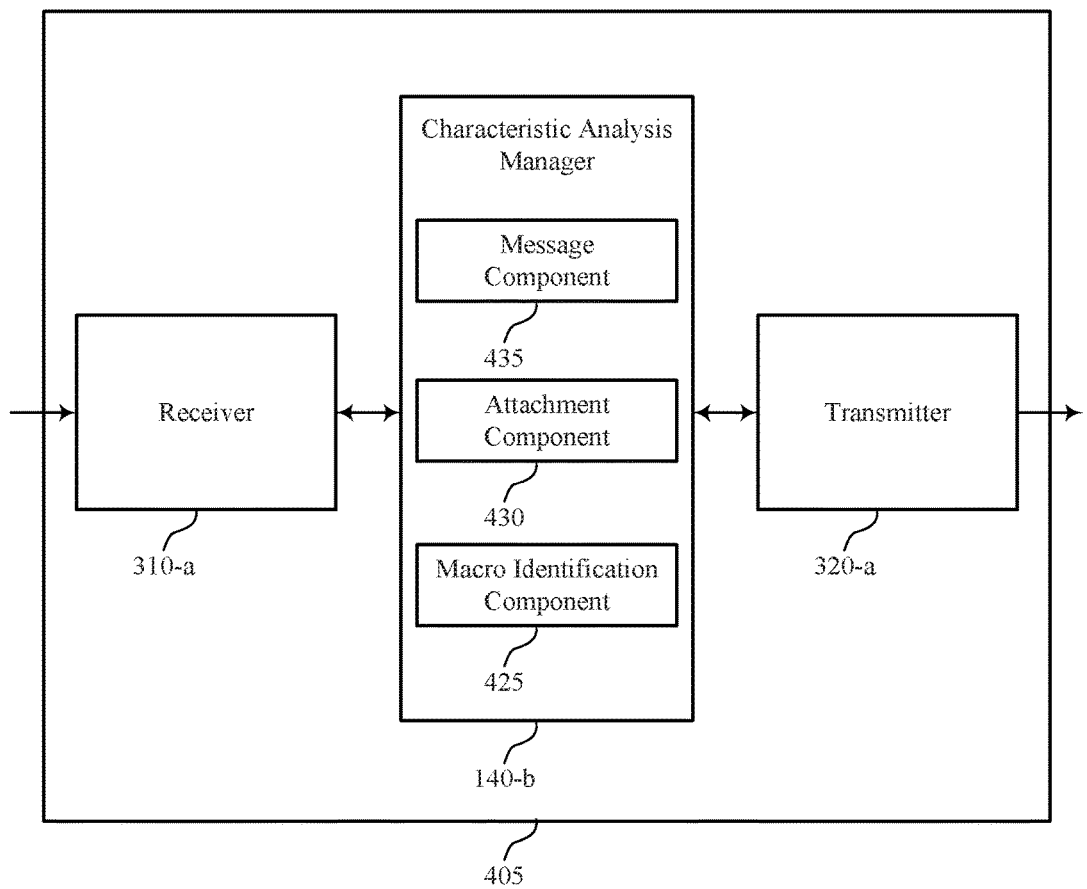

FIG. 4 illustrates a block diagram of a device 400 that supports detection of malicious attachments on messages, in accordance with one or more aspects of the present disclosure. Device 405 may be an example of aspects of device 105, device 105-*a*, device 305, or server 110 as described with reference to FIGS. 1 through 3. Device 405 may include one or more processors. Each of the components of device 405 may be in communication with one another (e.g., via one or more buses).

Receiver 310-*a* may receive electronic messages (e.g. emails, short message services (SMS) mobile messages) along with included metadata and unopened attachments over via an exchange server associated with a target domain of the device 405. Receiver 310-*a* may communicate with one or more servers 110 over a network 115 as described with reference to FIG. 1. A received electronic message and components of the electronic message may be passed on to other components of the device 405. In some cases, receiver 310-*a* may be an example of aspects of the transceiver 625 described with reference to FIG. 6. The receiver may utilize a single antenna or a set of antennas.

Characteristic analysis manager 140-*b* may be an example of aspects of the characteristic analysis manager 140 described with reference to FIG. 1 or characteristic analysis manager 140-*a* described with reference to FIG. 3. Characteristic analysis manager 140-*b* may also include a macro identification component 425, an attachment component 430, and a message component 435.

Macro identification component 425 may receive an electronic message and evaluate one or more unopened attachments included in and/or associated with the electronic message. Macro identification component 425 may identify at least one of fields and/or characteristics of the electronic message, the electronic message header, and the attachments, or any combination thereof. In some cases, macro identification component 425 may determine whether an attachment of the electronic message is macro embedded (i.e., contains a VBA). Based on the determination of a macro embedded attachment, macro identification component 425 may indicate that the attachment of the electronic message is malicious and initiate a security protocol of the device 405.

Attachment component 430 may receive the electronic message and evaluate the received message and/or one or more unopened attachments associated with the message. Attachment component 430 may identify the characteristic values of each unopened attachment contained within the message, including at least one of a creation time, an edit time, and a length of the attachment, or any combination thereof. Attachment component 430 may compare at least a portion of the detected characteristic values of the unopened attachments of the electronic message with one or more threshold values or threshold ranges configured for the device 405. Based on satisfaction of one or more of the thresholds and determinations, attachment component 430 may indicate that an attachment of the electronic message contains malware, and initiate a security protocol of the device 405.

Message component 435 may receive the electronic message and evaluate metadata associated with electronic message such as metadata of the message header. Message component 435 may process the header of the electronic message and parse identified data values of the contained header information, including at least one of a subject field, a send date field including a send time, a recipient field included in the metadata, or any combination thereof. In some cases, message component 435 may evaluate at least the content type listed in the header and the body of the electronic message, and determine additional characteristics associated with the message (e.g., whether the message contains attachments). Message component 435 may compare at least a portion of the detected characteristic values of the electronic message and/or message metadata with one or more threshold values or threshold ranges configured for the device 405. Upon satisfaction of one or more of the thresholds and determinations, message component 435 may indicate that an attachment of the electronic message contains malware, and initiate a security protocol of the device 405.

Transmitter 320-*a* may perform at least one of transmit signals generated by other components of the device 405, provide notification to one or more components of the device 405, and route data information. In some examples, transmitter 320-*a* may be collocated with receiver 310-*a* in a transceiver component. For example, transmitter 320-*a* may be an example of aspects of the transceiver 625 described with reference to FIG. 6. Transmitter 320-*a* may utilize a single antenna or a set of antennas.

Figure 5:
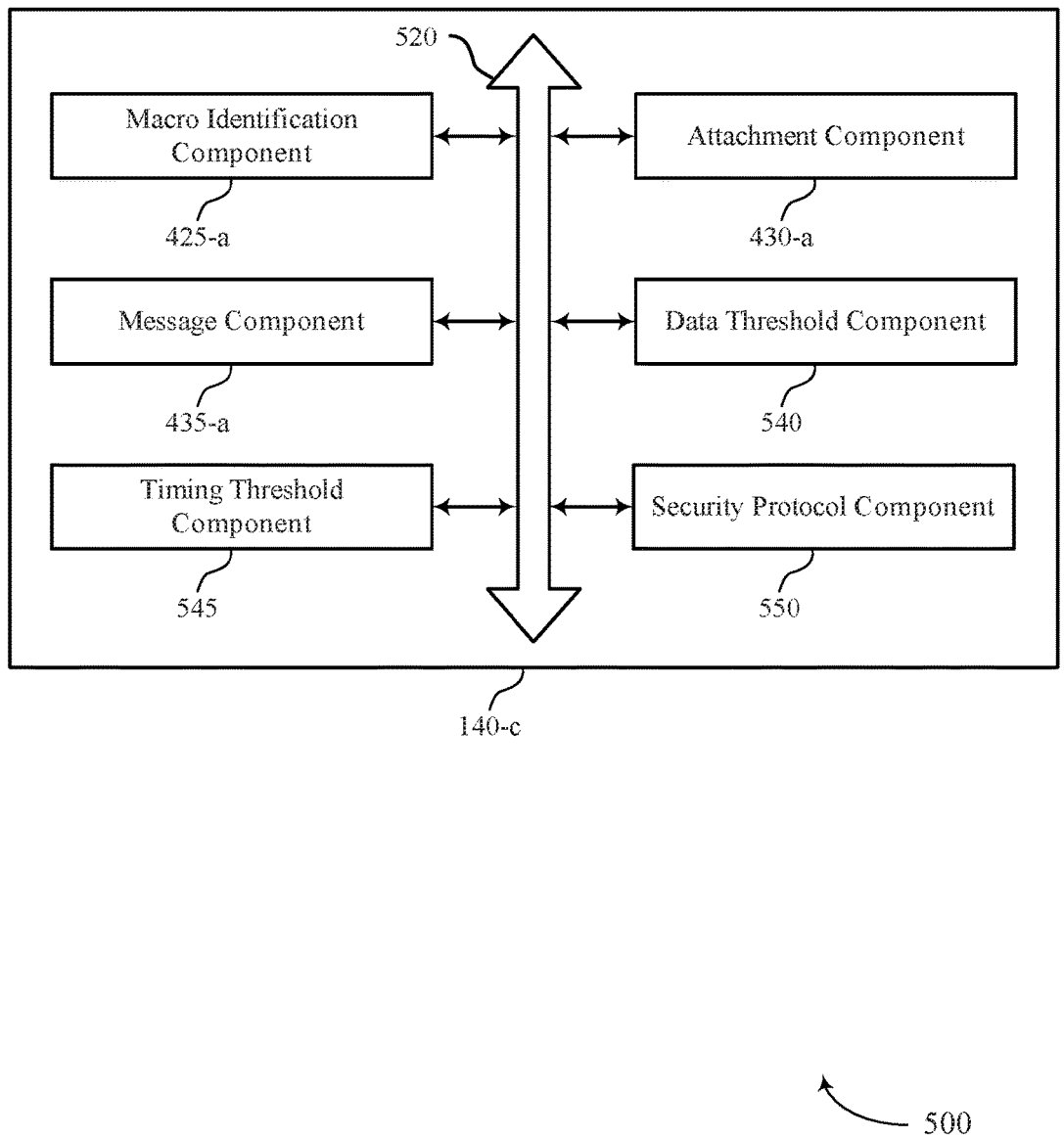

FIG. 5 illustrates a block diagram 500 of a device that supports detection of malicious attachments on messages, in accordance with one or more aspects of the present disclosure. The characteristic analysis manager 140-*c* may be an example of aspects of characteristic analysis manager 140, 140-*a*, and 140-*b* with reference to FIGS. 1, 3, and 4. The characteristic analysis manager 140-*c* may include macro identification component 425-*a*, attachment component 430-*a*, message component 435-*a*, data threshold component 540, timing threshold component 545, and security protocol component 550. Each of the components and managers may communicate, directly or indirectly, with one another (e.g., via one or more buses 520).

Macro identification component 425-*a* may receive an electronic message (e.g., email, SMS message, mobile notification message, tray notification, etc.). In some cases, a message may include one or more attachments. In some cases, macro identification component 425-*a* may evaluate the one or more unopened attachments included in the electronic message. Macro identification component 425-*a* may identify at least one of fields and characteristics of the electronic message, the electronic message header, and attachments, or any combination thereof. In some cases, macro identification component 425-*a* may determine whether an attachment of the electronic message is macro embedded (i.e. contains a VBA). Upon the determination of a macro embedded attachment, macro identification component 425-*a* may indicate that the attachment of the electronic message is malicious and initiate a security protocol. In some cases, initiating security protocol may include macro identification component 425-*a* informing security protocol component 550 (via bus 520) of malware within the evaluated electronic message. In other cases, macro identification component 425-*a* may be configured to implement security procedure including message flagging, and notification over an interface of the device.

Attachment component 430-*a* may receive the electronic message and evaluate the received message, and one or more unopened attachments included in the electronic message. Attachment component 430-*a* may identify the characteristic values of each unopened attachment contained within an electronic message, including at least one of a creation time, an edit time, and length of the attachment, or any combination thereof. Attachment component 430-*a* may compare at least a portion of the detected characteristic values of the unopened attachments of the electronic message with one or more data thresholds configured at data threshold component 540 and timing thresholds configured at timing threshold component 545. Upon satisfaction of one or more of the thresholds and determinations, attachment component 430-*a* may indicate that an attachment of the electronic message includes mal-ware, and initiate a security protocol. In some cases, initiating security protocol may include attachment component 430-*a* informing security protocol component 550 (via bus 520) of malware within the evaluated message. In other cases, macro identification component 425-*a* may be configured to implement security procedure including message flagging, and notification over an interface of a device.

Message component 435-a may receive the electronic message and evaluate and the included metadata of the electronic message header. Message component 435-a may receive the metadata of the electronic message header parse identified data values of the header, including at least one of a subject field, a send time field, a send date field, and a recipient field included in the metadata, or any combination thereof. In some cases, message component 435-a may evaluate at least a content type listed in the header and the body of the electronic message, and determine additional characteristics associated with the electronic message (e.g., whether the message contains attachments).

Message component 435-a may compare at least a portion of the detected characteristic values of the electronic message and electronic message metadata with one or more data thresholds configured at data threshold component 540 and timing thresholds configured at timing threshold component 545. Upon satisfaction of one or more of the thresholds and determinations, message component 435-a may indicate that an attachment of the electronic message contains malware, and initiate a security protocol. In some cases, initiating a security protocol may include message component 435-a informing security protocol component 550 (via bus 520) of malware within the evaluated electronic message. In other cases, macro identification component 425-a may be configured to implement security procedure including message flagging, and notification over an interface of a device.

Data threshold component 540 may configure and store data thresh-old values implemented by one or more components of characteristic analysis man-ager 140-c to determine at least whether an attachment of the received data message includes malware. The threshold values configured at data threshold component 540 may include binary (i.e. flag) values, numerical values, numerical ranges, and the like, displayed in at least one of units of time, memory, information, power, and electricity. In some cases, data threshold component 540 may dynamically alter data threshold values in accordance with one or more timing mechanisms, user settings, data configurations, and processors of a device (e.g., device 105, 305, and/or 405), configurations of a network (e.g., network 115), or settings of the one or more serv-ers (e.g., server 110) as described with reference to FIG. 1.

Data threshold component 540 may interact with macro identification component 425-a, attachment component 430-a, and message component 435-a to compare one or more identified characteristics of the components, and determine at least if an unopened attachment of the electronic message is malicious. In some cases, data threshold component 540 may interact with one or more components of characteristic analysis manager 140-c to compare a single characteristic of the electronic message with one or more threshold values stored at data threshold component 540. In other cases, data threshold component 540 may interact with one or more components of characteristic analysis manager 140-c to compare a multiplicity of characteristics including the electronic message, the electronic message header, and the attachments, with thresholds stored at data threshold component 540 simultaneously and/or sequentially.

Timing threshold component 545 may configure and store timing threshold values implemented by one or more components of characteristic analysis manager 140-c to determine at least whether an unopened attachment of a received message includes malware. The threshold values configured at timing threshold component 545 may include time values and ranges implemented for comparison of logged timing data of the message and logged timing data of attachments of the electronic message (e.g., send time, send date, creation time, edit time). In some cases, timing threshold component 545 may dynamically alter time threshold values in accordance with one or more timing mechanisms, user settings, data configurations, and processors of a device (e.g., device 105, 305, and 405), configurations of a network (e.g., network 115), or settings of the one or more servers (e.g., server 110) as described with reference to FIG. 1.

Timing threshold component 545 may interact with macro identification component 425-a, attachment component 430-a, and message component 435-a to compare one or more identified characteristics of the components, and determine at least if an unopened attachment of the electronic message is malicious. Message component 435-a may be configured to store timing values associated with a multiplicity of timing characteristics of the electronic message. In some cases, a component of characteristic analysis manager 140-c may compare a calculated difference, product, quotient, or the like of multiple timing characteristics identified and determined by the component with a configured characteristic of timing threshold component 545. In other cases, a component of characteristic analysis manager 140-c may compare a singular timing value with a configured characteristic of timing threshold component 545.

Security protocol component 550 may configure and determine one or more security procedures related to a malware determination via one or more components of characteristics analysis manager 140-c. Security protocol component 550 may include command instructions for indicating (i.e. flagging) a malicious message received by characteristic analysis manager 140-c, as well as initiating security procedure. Security procedure may include instructions for user notification via an interface of a device and in some cases, quarantining the electronic message within a designated portion of device memory. In some cases, security protocol component 550 may be configured to receive a malicious message indication from a component of characteristic analysis component 104-c and execute security procedure. In other cases, security protocol component 550 may be configured to receive a malicious message indication from a component of characteristic analysis component 104-c and provide command instructions associated with security procedure to the component.

Figure 6:
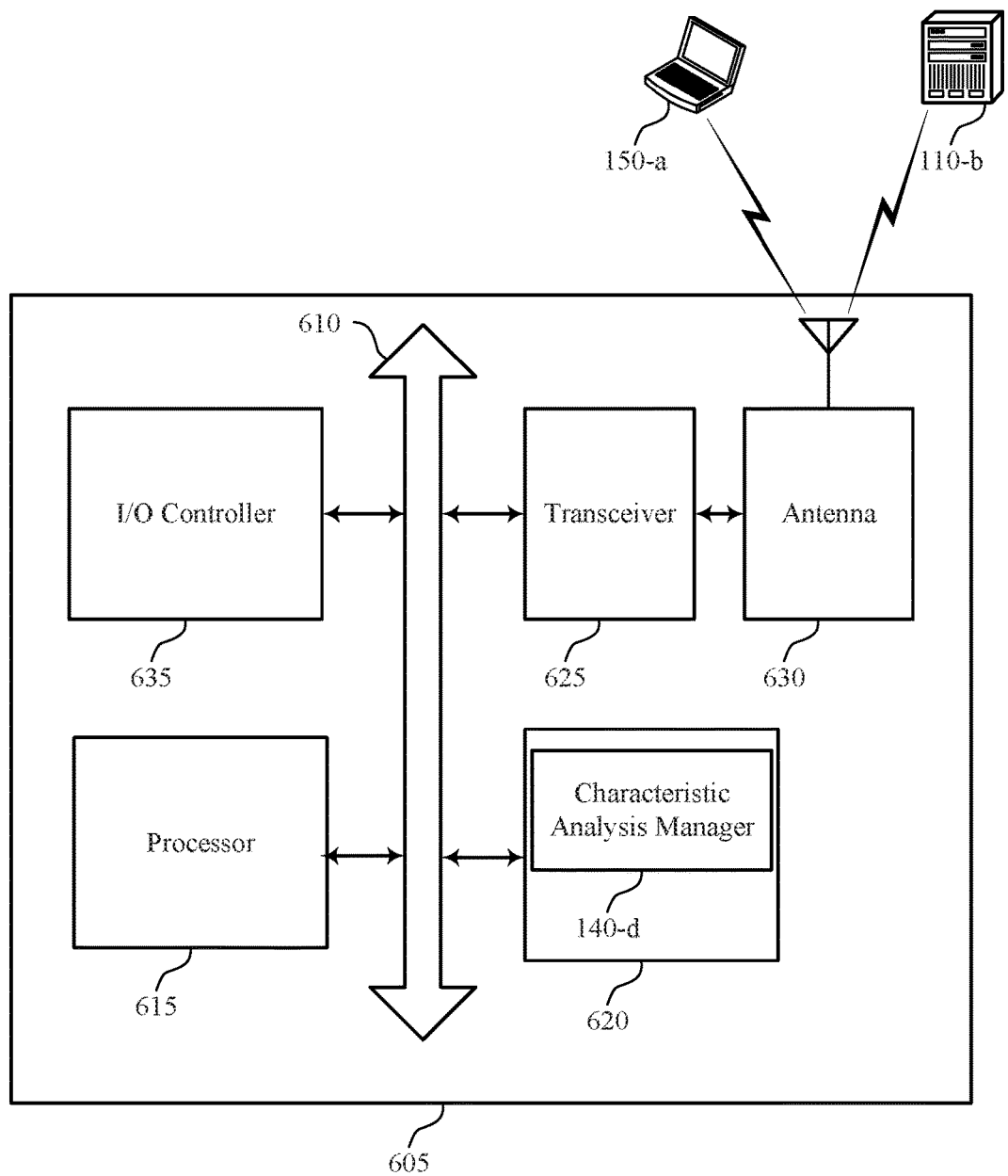
FIG. 6 illustrates a block diagram of a system including a computing device and a server that supports detection of malicious attachments on messages, in accordance with one or more aspects of the present disclosure.

FIG. 6 illustrates a block diagram of a system including a device 605, a computing device 150-a, and a server 110-a that supports detection of malicious attachments on messages, in accordance with one or more aspects of the pre-sent disclosure. The device 605, computing device 150-a may be an example of de-vice 105, 305, and 405, or computing device 150 as described with reference to FIG. 1 through 4. Device 605 may include a bus 610 which interconnects major subsystems of device 605, such as one or more processors 615, a system memory 620 (typically RAM, but which may also include ROM, flash RAM, or the like), an I/O controller 635, a transceiver 625, and an antenna 630.

Bus 610 allows data communication between a processor 615 and system memory 620, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) or a Unified Extensible Firmware Interface (UEFI), which controls basic hardware operation such as the interaction with peripheral components or devices. For example, characteristic analysis manager 140-d, to implement the present techniques, may be stored within system memory 620. Characteristic analysis manager 140-d may be an example of the characteristic analysis manager 140, 140-a, 140-b, and 140-c with reference to FIGS. 1, 3, 4, and 5. Applications resident within device 605 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 7:
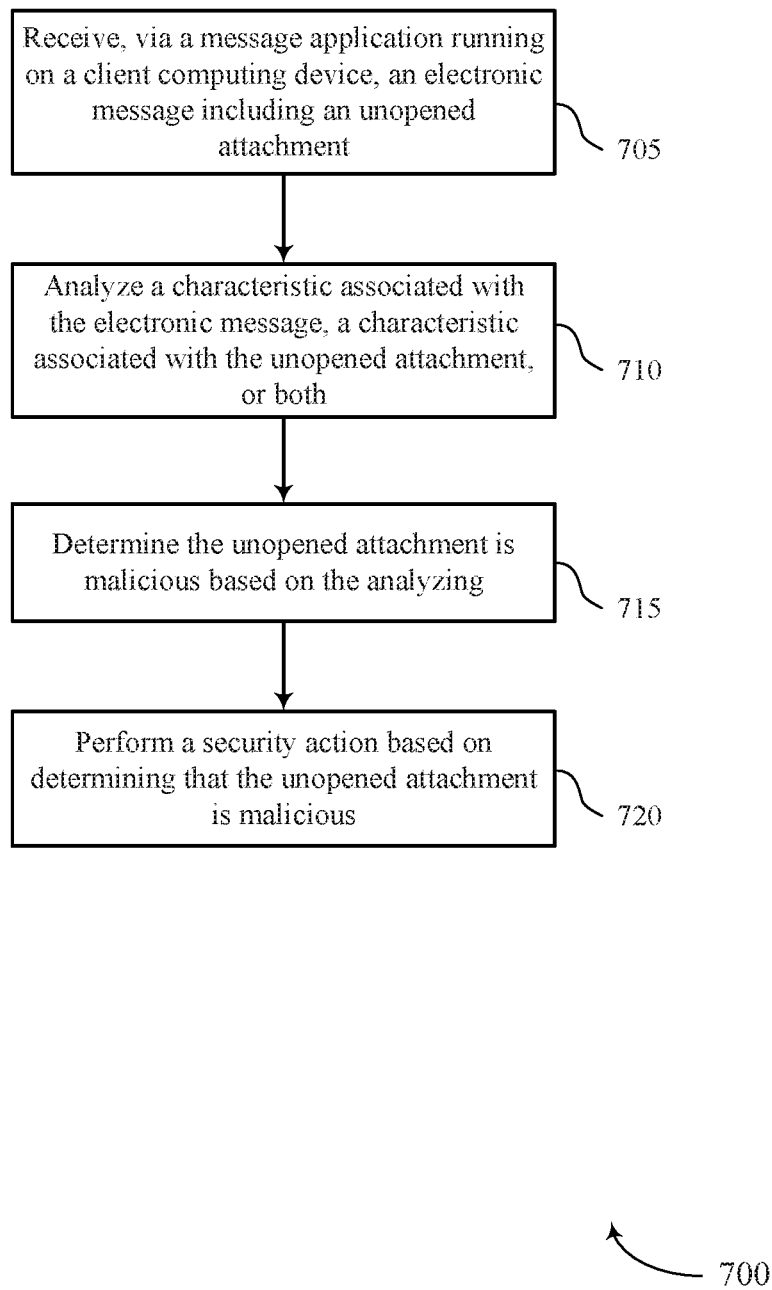
FIGS. 7 through 9 illustrate methods for detection of malicious attachments on messages, in accordance with one or more aspects of the present disclosure.

FIG. 7 illustrates a method 700 for detection of malicious attachments on messages, in accordance with one or more aspects of the present disclosure. In some configurations, the method 700 may be implemented by the characteristic analysis manager 140 as described with reference to FIGS. 1, 3, 4, 5, and 6. In some configurations, the method 700 may be implemented in conjunction with the application 135 and/or the user interface 130 as described with reference to FIG. 1.

At block 705, characteristic analysis manager 140 may receive, via a message application running on a client computing device, an electronic message including an unopened attachment. In some cases, the electronic message may include an email, SMS message, a notification mobile message etc. that includes an unopened attachment.

At block 710, characteristic analysis manager 140 may analyze a characteristic associated with the electronic message or the unopened attachment, or both. At block 715, characteristic analysis manager 140 may determine that the unopened attachment is malicious based on the analyzing. At block 720, characteristic analysis manager 140 may perform a security action based on determining that the unopened attachment is malicious. For example, characteristic analysis manager 140 may determine that the unopened attachment includes an embedded macro. The macro may be associated with a VBA. In some cases, a security action may include characteristic analysis manager 140 flagging the electronic message, and providing for display the flagged electronic message to a user. For example, a device (e.g., device 105 or computing device 145) may display via an interface of the device a notification indicating that the electronic message is flagged. In some cases, a flagged electronic message may indicate to a user of a device that the electronic message is malicious. Additionally or alternatively, the security action may include characteristic analysis manager 140 quarantining the electronic message based on a security policy.

Figure 8:
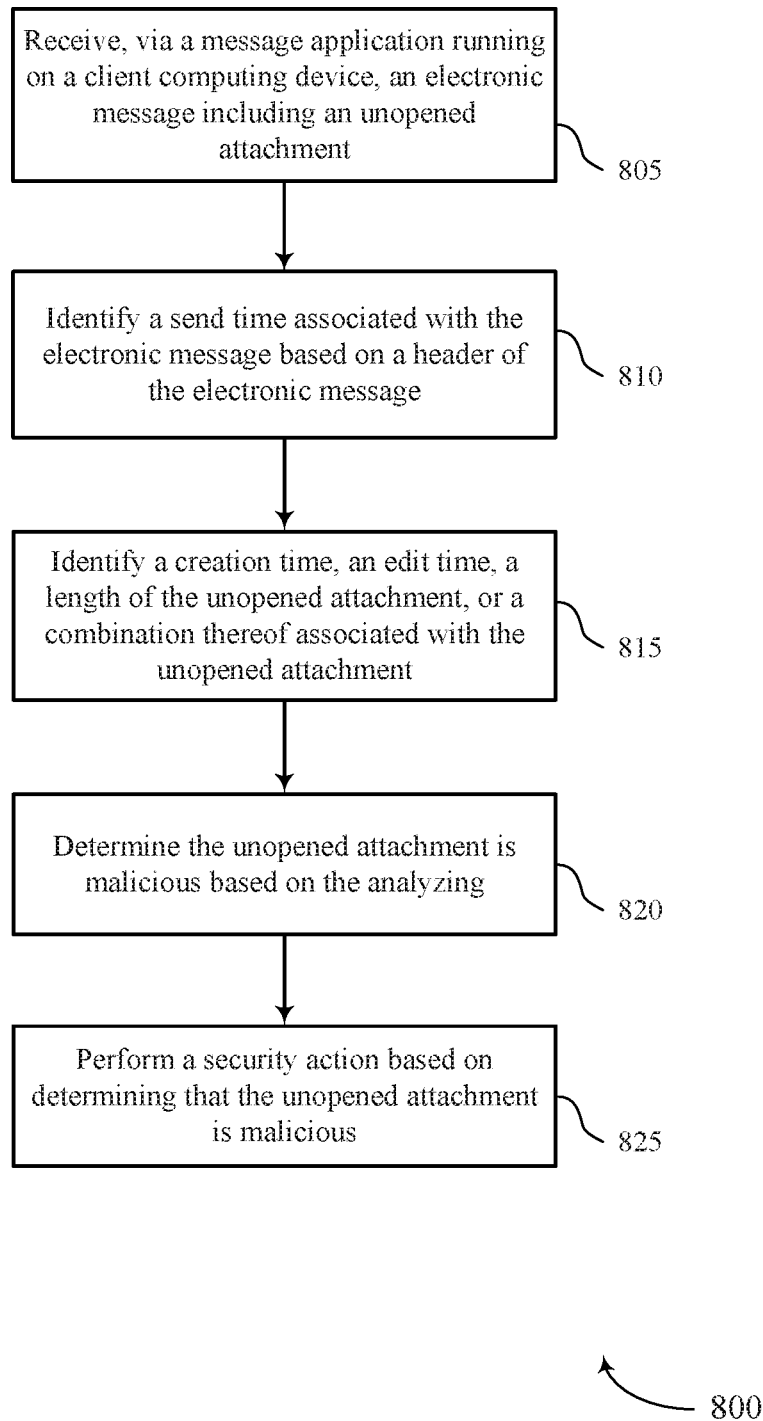

FIG. 8 illustrates a method 800 for detection of malicious attachments on messages, in accordance with one or more aspects of the present disclosure. In some configurations, the method 800 may be implemented by the characteristic analysis manager 140 as described in FIGS. 1, 3, 4, 5, and 6. In some configurations, the method 800 may be implemented in conjunction with the application 135 and/or the user interface 130 as described in FIG. 1.

At block 805, characteristic analysis manager 140 may receive, via a message application running on a client computing device (e.g. device 105), an electronic message including an unopened attachment. At block 810, characteristic analysis manager 140 may identify a send time associate with the electronic message based on a header of the electronic message.

At block 815, characteristic analysis manager 140 may identify a creation time, an edit time, a length of the unopened attachment, or a combination thereof associated with the unopened attachment. In some cases, the characteristic analysis manager 140 may make this identification based on metadata of the electronic message. At block 820, characteristic analysis manager 140 may determine that the unopened attachment is malicious, based on the analyzing. At block 825, characteristic analysis manager 140 may perform a security action based on determining that the unopened attachment is malicious.

Figure 9:
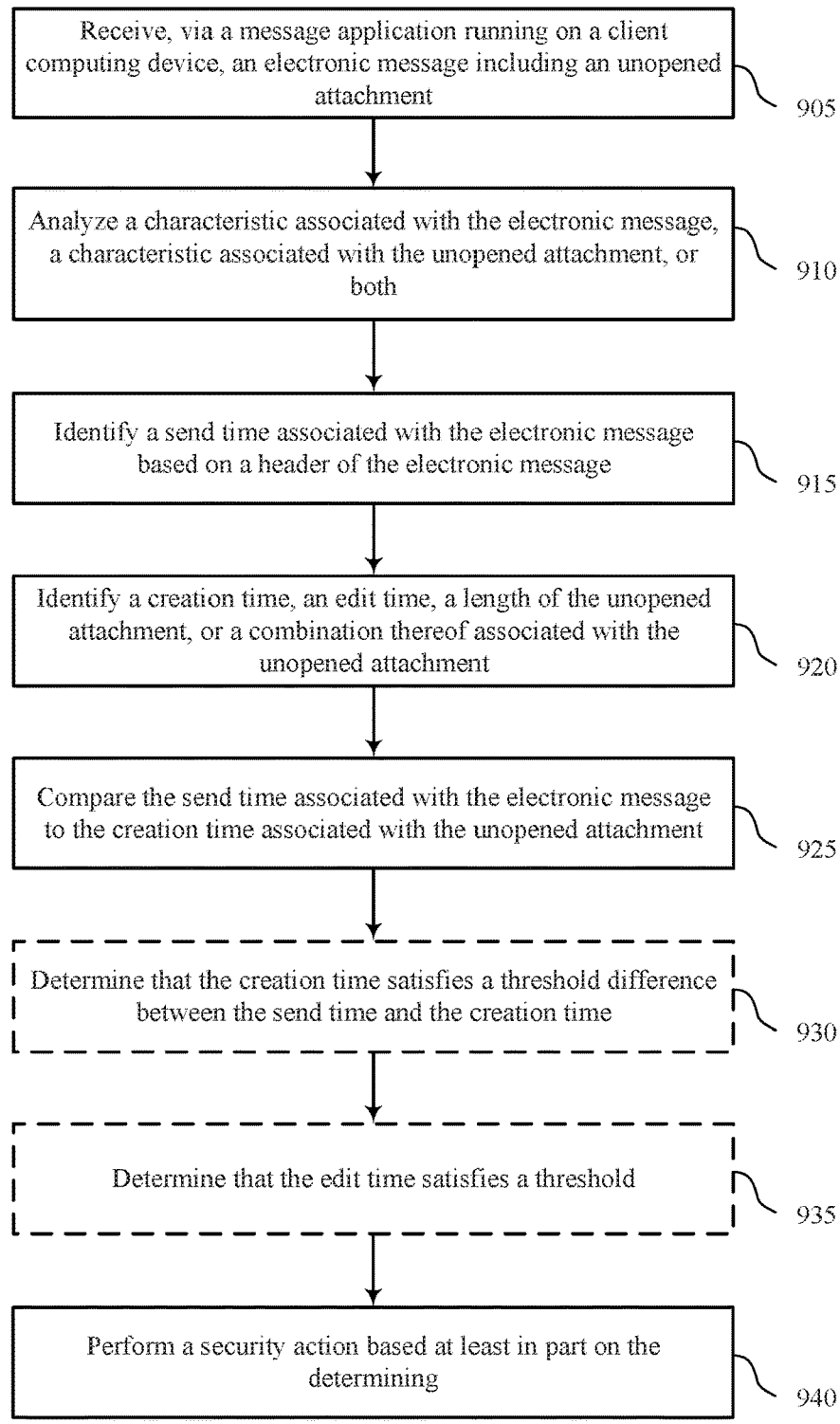

FIG. 9 illustrates a method 900 for detection of malicious attachments on messages, in accordance with one or more aspects of the present disclosure. In some configurations, the method 900 may be implemented by the characteristic analysis manager 140 as described in FIGS. 1, 3, 4, 5, and 6. In some configurations, the method 900 may be implemented in conjunction with the application 135 and/or the user interface 130 as described in FIG. 1.

At block 905, characteristic analysis manager 140 may receive, via a message application running on a client computing device, an electronic message including an unopened attachment. At block 910, characteristic analysis manager 140 may analyze a characteristic associated with the electronic message, a characteristic associated with the unopened attachment, or both. At block 915, characteristic analysis manager 140 may identify a send time associated with the electronic message based on the header of the electronic message. At block 920, characteristic analysis manager 140 may identify a creation time, an edit time, a length of the unopened attachment or a combination thereof. At block 925, characteristic analysis manager 140 may compare the send time associated with the electronic message to the creation time associated with the unopened attachment. At block 930, characteristic analysis manager 140 may optionally determine that the creation time satisfies a threshold difference between the send time and the creation time. At block 935, characteristic analysis manager 140 may determine that the edit time satisfies a threshold. In some cases, characteristic analysis manager 140 may perform the determination at block 935 based on the result of the determining at block 930. At block 940, characteristic analysis manager 140 may perform a security action based on determining.

Figure 10:
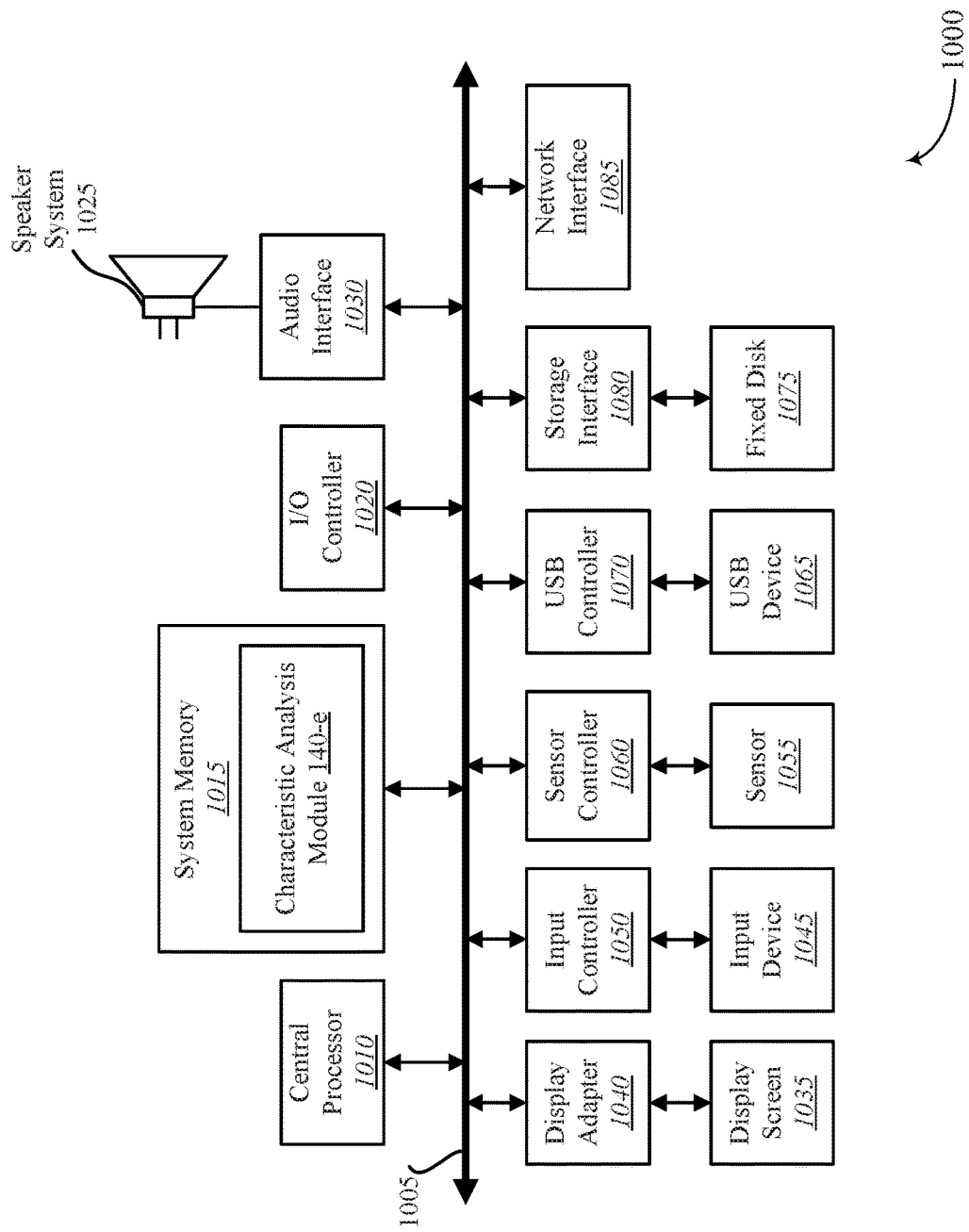
FIG. 10 illustrates a block diagram of a computer system that supports detection of malicious attachments on messages, in accordance with one or more aspects of the present disclosure.

FIG. 10 illustrates a block diagram of a computer system 1000 that supports detection of malicious attachments on messages, in accordance with one or more aspects of the present disclosure. The computer system 1000 may be an example of at least one of device 105, 305, or 405, or computing device 150, or server 110 as described with reference to FIG. 1 through 4. In one configuration, computer system 1000 includes a bus 1005 which interconnects major subsystems of computer system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include ROM or flash memory (neither shown), and RAM (not shown), as previously noted. The RAM is generally the main memory into which the operating system and application programs are loaded. The ROM or flash memory can contain, among other code, the BIOS or the UEFI, which controls basic hardware operation such as the interaction with peripheral components or de-vices. For example, the characteristic analysis manager 140-e, to implement the pre-sent techniques, may be stored within the system memory 1015. Applications (e.g., application 135) resident with computer system 1000 are generally stored on and ac-cessed via a non-transitory computer readable medium, such as a hard disk drive (e.g., fixed disk 1075) or other storage medium. Additionally, applications can be in the form of electronic signals modulated in accordance with the application and data communication technology when accessed via interface 1085.

Bus 1205 allows data communication between central processor 1010 and system memory 1015, which may include ROM or flash memory (neither shown), and RAM (not shown), as previously noted. The RAM is generally the main memory into which the operating system and application programs are loaded. The ROM or flash memory can contain, among other code, the BIOS or the UEFI, which controls basic hardware operation such as the interaction with peripheral components or devices. For example, the characteristic analysis manager 140-e, to implement the present techniques, may be stored within the system memory 1015. Applications (e.g., application 135) resident with computer system 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via interface 1085.

Storage interface 1080, as with the other storage interfaces of computer system 1000, can connect to a standard computer readable medium for storage and/or retrieval of information, such as a fixed disk drive 1075. Fixed disk drive 1075 may be a part of computer system 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present techniques. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on computer system 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computer system 1000 may include wireless communication signals such as radio frequency, electromagnetics, local area network (LAN), wide area network (WAN), metropolitan area network (MAN), virtual private network (VPN), wireless network (using 802.11, for example), cellular network (using 3G and/or LTE, for example), and/or other signals. The network interface 1085 may enable one or more of WWAN (GSM, CDMA, and WCDMA), WLAN (including BLU-ETOOTH® and Wi-Fi), WMAN (WiMAX) for mobile communications, antennas for Wireless Personal Area Network (WPAN) applications (including RFID and UWB), etc.

Figure 11:
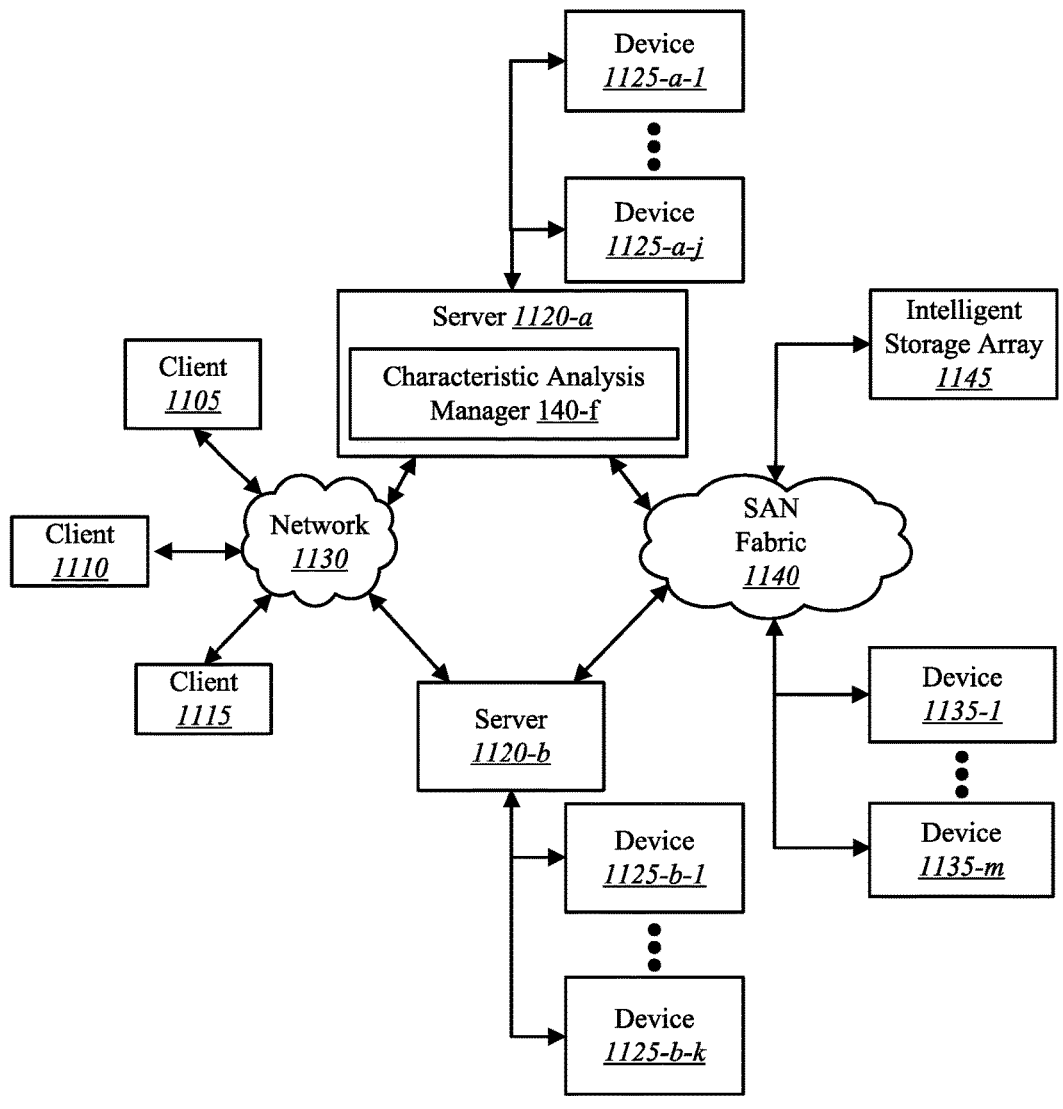
FIG. 11 illustrates a block diagram of a network architecture in which client systems and storage servers may be coupled to a network, in accordance with one or more aspects of the present disclosure.

The I/O controller 1020 may operate in conjunction with network interface 1085 and/or storage interface 1080. The network interface 1085 may enable computer system 1000 with the ability to communicate with client devices (e.g., device 105 of FIG. 1), and/or other devices over the network 115 of FIG. 1. Network interface 1085 may provide wired and/or wireless network connections. In some cases, network interface 1085 may include an Ethernet adapter or Fiber Channel adapter. Storage interface 1080 may enable computer system 1000 to access one or more data storage devices. The one or more data storage devices may include two or more data tiers each. The storage interface 1080 may include one or more of an Ethernet adapter, a Fiber Channel adapter, Fiber Channel Protocol (FCP) adapter, a SCSI adapter, and iSCSI protocol adapter FIG. 11 illustrates a block diagram of a network architecture 1100 in which client systems 1105, 1110, and 1115, and storage servers 1120-a and 1120-b may be coupled to a network 1130, in accordance with one or more aspects of the present disclosure. In one embodiment, the characteristic analysis manager 140-f may be located within one of the storage servers 1120-a, 1120-b to implement the present techniques. The characteristic analysis manager 140-f may be one example of characteristic analysis manager 140, 140-a, 140-b, 140-c, 140-d, and 140-e depicted in FIGS. 1, 3, 4, 5, and/or 6. The storage server 1120-a is further depicted as having storage devices 1125-a-1 through 1125-a-j directly attached, and storage server 1120-b is depicted with storage devices 1125-b-1 through 1125-b-k directly attached. SAN fabric 1140 supports access to storage devices 1135-1 through 1135-m by storage servers 1120-a and 1120-b, and so by client systems 1105, 1110 and 1115 via network 1130. Intelligent storage array 1145 is also shown as an example of a specific storage device accessible via SAN fabric 1140.

With reference to computer system 1100, network interface 1185 or some other means or method can be used to provide connectivity from each of client computer systems 1105, 1110 and 1115 to network 1130. With reference to computer system 600, transceiver 625 or some other means or method can be used to provide connectivity from each of client computer systems 1105, 1110 and 1115 to network 1130. Client systems 1105, 1110 and 1115 are able to access information on storage server 1120-a or 1120-b using, for example, a web browser or other client software (not shown). Such a client allows client systems 1105, 1110 and 1115 to access data hosted by storage server 1120-a or 1120-b or one of storage devices 1125-a-1 through 1125-a-j, 1125-b-1 through 1125-b-k, 1135-1 through 1135-m, or intelligent storage array 1145. FIG. 11 depicts the use of a network such as the Internet for exchanging data, but the present techniques are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present techniques and their practical applications, to thereby enable others skilled in the art to best utilize the present techniques and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for detecting malicious attachments on electronic messages, the method being performed by one or more computing devices comprising at least one processor, the method comprising:
    receiving, via a message application running on a client computing device, an electronic message including an unopened attachment;
    analyzing a characteristic associated with the electronic message, a characteristic associated with the unopened attachment, or both;
    determining the unopened attachment is malicious based at least in part on the analyzing, comprising comparing a send time associated with the electronic message to a creation time associated with the unopened attachment, and determining that the creation time satisfies a threshold difference between the send time and the creation time; and
    performing a security action based at least in part on determining the unopened attachment is malicious.

2. The method of claim 1, wherein analyzing the characteristic associated with the electronic message, the characteristic associated with the unopened attachment, or both further comprises:
    identifying the send time associated with the electronic message based at least in part on a header of the electronic message; and
    identifying the creation time, an edit time, a length of the unopened attachment, or a combination thereof associated with the unopened attachment.

3. The method of claim 1, further comprising:
    determining that the edit time satisfies a threshold based at least in part on determining that the creation time does not satisfy the threshold difference, wherein determining that the edit is below the threshold indicates that the unopened attachment is created via automation.

4. The method of claim 3, wherein the threshold comprises a threshold value or a threshold range.

5. The method of claim 1, wherein determining that the unopened attachment is malicious further comprises:
determining that the length of the unopened attachment is above a threshold length, wherein the length includes a number of pages.

6. The method of claim 1, wherein determining that the unopened attachment is malicious further comprises:
determining that the unopened attachment includes an embedded macro.

7. The method of claim 1, wherein performing the security action further comprises:
flagging the electronic message; and
providing for display the flagged electronic message to a user via a user interface of the client device.

8. The method of claim 1, wherein performing the security action further comprises:
quarantining the electronic message based at least in part on a security policy.

9. The method of claim 1, wherein the electronic message comprises an email.

10. The method of claim 1, wherein the characteristic associated with the electronic message comprises a subject field, a send time field, a send date field, a recipient field, or a combination thereof.

11. The method of claim 1, wherein the unopened attachment comprises a macro-embedded document.

12. The method of claim 1, wherein the characteristic associated with the unopened attachment comprises a creation time, a save time, an edit time, a number of pages, or a file format, a macro, or a combination thereof.

13. A computing device configured for detecting malicious attachments on electronic messages, further comprising:
one or more processors;
memory in electronic communication with the one or more processors, wherein the memory stores computer executable instructions that when executed by the one or more processors cause the one or more processors to:
receive, via a message application running on the computing device, an electronic message including an unopened attachment;
analyze a characteristic associated with the electronic message, a characteristic associated with the unopened attachment, or both;
determine the unopened attachment is malicious based at least in part on the analyzing, comprising comparing a send time associated with the electronic message to a creation time associated with the unopened attachment, and determining that the creation time satisfies a threshold difference between the send time and the creation time; and
perform security action based at least in part on determining the unopened attachment is malicious.

14. The computing device of claim 13, wherein analyzing the characteristic associated with the electronic message, the characteristic associated with the unopened attachment, or both further comprises:
identifying the send time associated with the electronic message based at least in part on a header of the electronic message; and
identifying the creation time, an edit time, a length of the unopened attachment, or a combination thereof associated with the unopened attachment.

15. The computing device of claim 13, wherein determining the unopened attachment is malicious further comprises:
determining that the unopened attachment includes an embedded macro.

16. The computing device of claim 13, wherein performing the security action further comprises:
flagging the electronic message; and
providing for display the flagged electronic message to a user via a user interface of the client device.

17. The computing device of claim 13, wherein performing the security action further comprises:
quarantining the electronic message based at least in part on a security policy.

18. A non-transitory computer-readable medium storing computer executable instructions that when executed by the one or more processors cause the one or more processors to:
receive, via a message application running on a client computing device, an electronic message including an unopened attachment;
analyze a characteristic associated with the electronic message, a characteristic associated with the unopened attachment, or both;
determine the unopened attachment is malicious based at least in part on the analyzing, comprising comparing a send time associated with the electronic message to a creation time associated with the unopened attachment, and determining that the creation time satisfies a threshold difference between the send time and the creation time; and
perform security action based at least in part on determining that the unopened attachment is malicious.

* * * * *